(12) United States Patent
Graf et al.

(10) Patent No.: US 9,144,740 B2
(45) Date of Patent: Sep. 29, 2015

(54) SYSTEMS AND METHODS FOR VIDEO GAME PARTICIPATION VIA SOCIAL NETWORK INTERACTIONS

(71) Applicant: Epic Games, Inc., Cary, NC (US)

(72) Inventors: Joseph James Graf, Cary, NC (US); Geremy Steele Mustard, Springville, UT (US)

(73) Assignee: EPIC GAMES, INC., Cary, NC (US)

( * ) Notice: Subject to any disclaimer, the term of this patent is extended or adjusted under 35 U.S.C. 154(b) by 134 days.

(21) Appl. No.: 13/837,954

(22) Filed: Mar. 15, 2013

(65) Prior Publication Data

US 2013/0260895 A1 Oct. 3, 2013

Related U.S. Application Data

(60) Provisional application No. 61/618,024, filed on Mar. 30, 2012, provisional application No. 61/618,053, filed on Mar. 30, 2012.

(51) Int. Cl.
*A63F 13/12* (2006.01)
*G07F 17/32* (2006.01)
*A63F 13/30* (2014.01)
*A63F 13/35* (2014.01)
*A63F 13/45* (2014.01)
*A63F 13/795* (2014.01)
*A63F 13/847* (2014.01)

(52) U.S. Cl.
CPC ................. *A63F 13/12* (2013.01); *A63F 13/35* (2014.09); *A63F 13/45* (2014.09); *A63F 13/795* (2014.09); *A63F 13/847* (2014.09)

(58) Field of Classification Search
USPC .......................................... 463/42
See application file for complete search history.

(56) References Cited

U.S. PATENT DOCUMENTS

2012/0278262 A1* 11/2012 Morgenstern et al. .......... 706/12
2014/0278853 A1* 9/2014 Brown et al. .............. 705/14.12

* cited by examiner

*Primary Examiner* — Pierre E Elisca
(74) *Attorney, Agent, or Firm* — Hunton & Williams LLP

(57) ABSTRACT

Various exemplary embodiments use social networks and their social graph APIs to participate in a game without needing to own, install, or play the game. These embodiments have the game post data to social networks and then allow the social media users to interact with that data. The embodiments perform this interaction without ever having to download, install, or play the game. The games then read that interaction and score it for participation in the game.

19 Claims, 3 Drawing Sheets

SYSTEMS AND METHODS FOR VIDEO GAME PARTICIPATION VIA SOCIAL NETWORK INTERACTIONS

CROSS-REFERENCE TO RELATED APPLICATIONS

This patent application claims priority to U.S. Provisional Patent Application No. 61/618,024, filed Mar. 30, 2012, entitled "Systems and Methods for Video Game Participation Via Social Network Interactions," to Joseph James Graf and Geremy Mustard and U.S. Provisional Patent Application No. 61/618,053, filed Mar. 30, 2012, entitled "Systems and Methods for Socially Motivated Multiplayer Gaming," to Joseph James Graf, Donald Mustard, and Geremy Mustard, the contents of which are incorporated herein in its entirety.

FIELD OF THE DISCLOSURE

Embodiments of the present invention relate to systems and methods for video game participation via social network interactions.

BACKGROUND OF THE DISCLOSURE

In order to interact with a game, players are usually required to own, install, or play the game in question in order to participate within it. This limits the scope of the players that can participate. Even Web-based or Adobe Flash-based games generally require the user to download and play the game, limiting the number of people that can potentially share in the game's goals. These and other drawbacks exist.

SUMMARY OF THE DISCLOSURE

Various exemplary embodiments use social networks and their social graph APIs to participate in a game without needing to own, install, or play the game. These embodiments may involve having the game post data to social networks and then allowing social media users to interact with the posted data. The embodiments may perform this interaction without having to download, install, or even play the game. The games may then receiving and analyze that interaction and score (or otherwise assess) it for participation in the game.

BRIEF DESCRIPTION OF THE DRAWINGS

The present disclosure, together with further objects and advantages, may best be understood by reference to the following description taken in conjunction with the accompanying drawings, in the several Figures of which like reference numerals identify like elements, and in which.

DETAILED DESCRIPTION OF EXEMPLARY EMBODIMENT(S)

Figure 1:
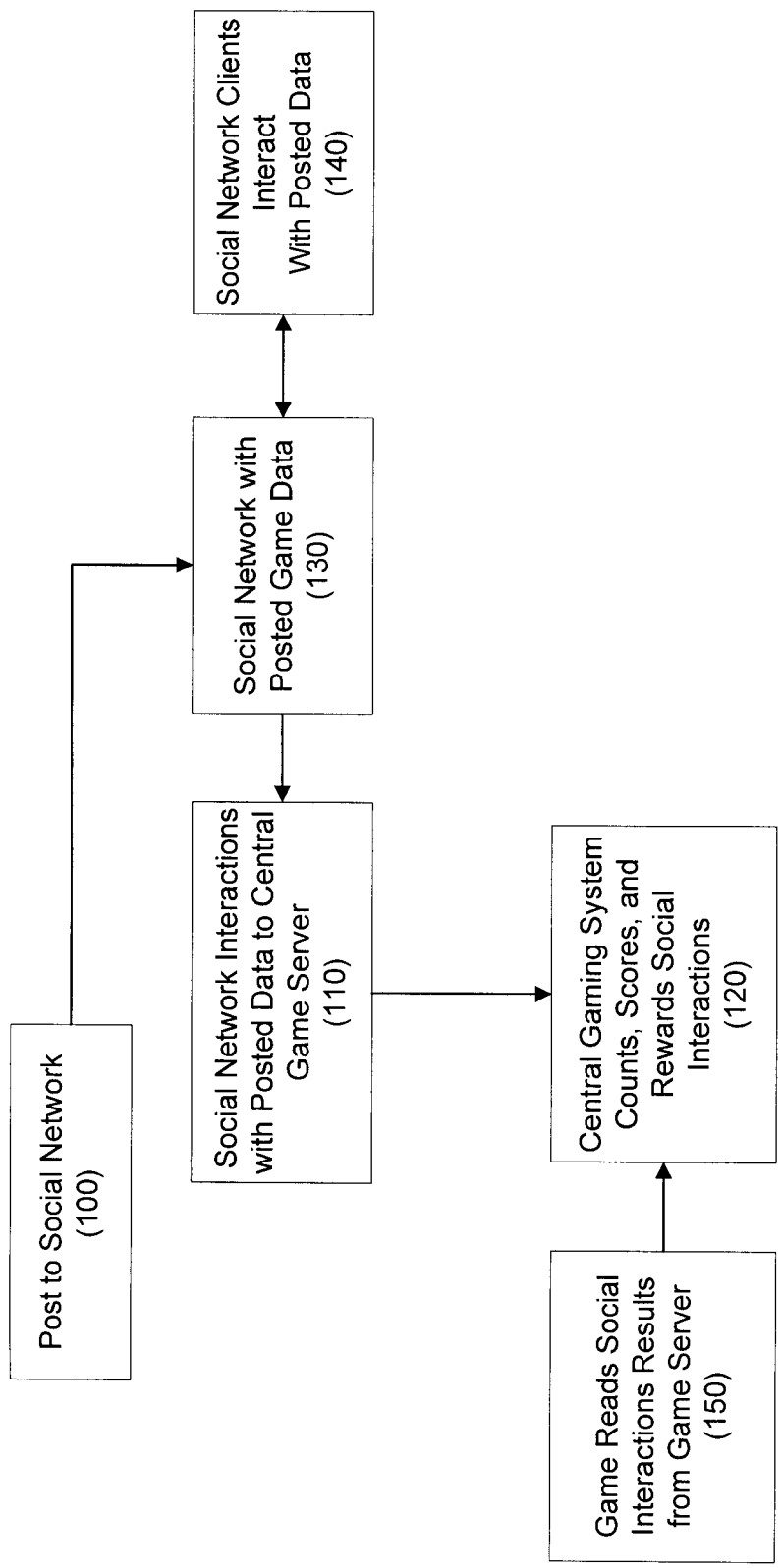
FIG. 1 is a flowchart illustrating social game interactions by a gamer system, central game system, and social network system according to a particular embodiment.

The following description is intended to convey a thorough understanding of the embodiments described by providing a number of specific embodiments and details involving systems and methods for video game participation via social network interactions. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Various exemplary embodiments provide for socially motivated multiplayer gaming.

The following terms referred to herein may be understood as follows:

In various embodiments, the terms "game" or "client" may refer to the software product a person is using.

In various embodiments, the terms "gamer", "player", or "user" may refer to the individual that is interacting with the game.

In various embodiments, the phrase "game server" may refer to the networked computer or groups of computers that process the global game event state.

In various embodiments, the phrase "social network" may refer to a media that users interact with socially, such as, for example, Facebook, MySpace, YouTube, Pinterest, or other like social network.

In various embodiments, the phrase "social graph API" may prefer to the application programming interface for manipulating social network objects. The social graph API manages the connections between objects and the information of how those objects relate.

A system and method for social game participation and interaction may include various exemplary embodiments for interacting with a game using social networking. The system and method may include at least one gamer system, at least one central gaming system, and at least one social network system. In certain embodiments, the gamer system and the central gaming system may be the same system, so that the gamer system may interact with a social network system without the aid of a central gaming system. Where the gamer system and social network system interact without a central gaming system, components of the central gaming system described below may be included in the gamer system. An exemplary embodiment may allow a gamer to publish gaming data relating to gameplay. An exemplary embodiment may track interactions with published gaming data and calculate a score based on the tracked interactions. Additionally, an exemplary embodiment may apply a calculated score to the gameplay associated with the gaming data. An exemplary embodiment may also track a primary interaction with a secondary (e.g., "liking" a comment on published gaming data) and use these secondary tracked interactions in a secondary score calculation, which may then be applied to a gameplay score associated with the initial published gameplay data. A gameplay score may also be based on characteristics associated with the interactor of the interaction. For example, the size of an interactor's social network and/or the number of gamers participating in the gameplay even that the interactor is connected to via a social network may be considered in determining a gameplay score.

Figure 3:
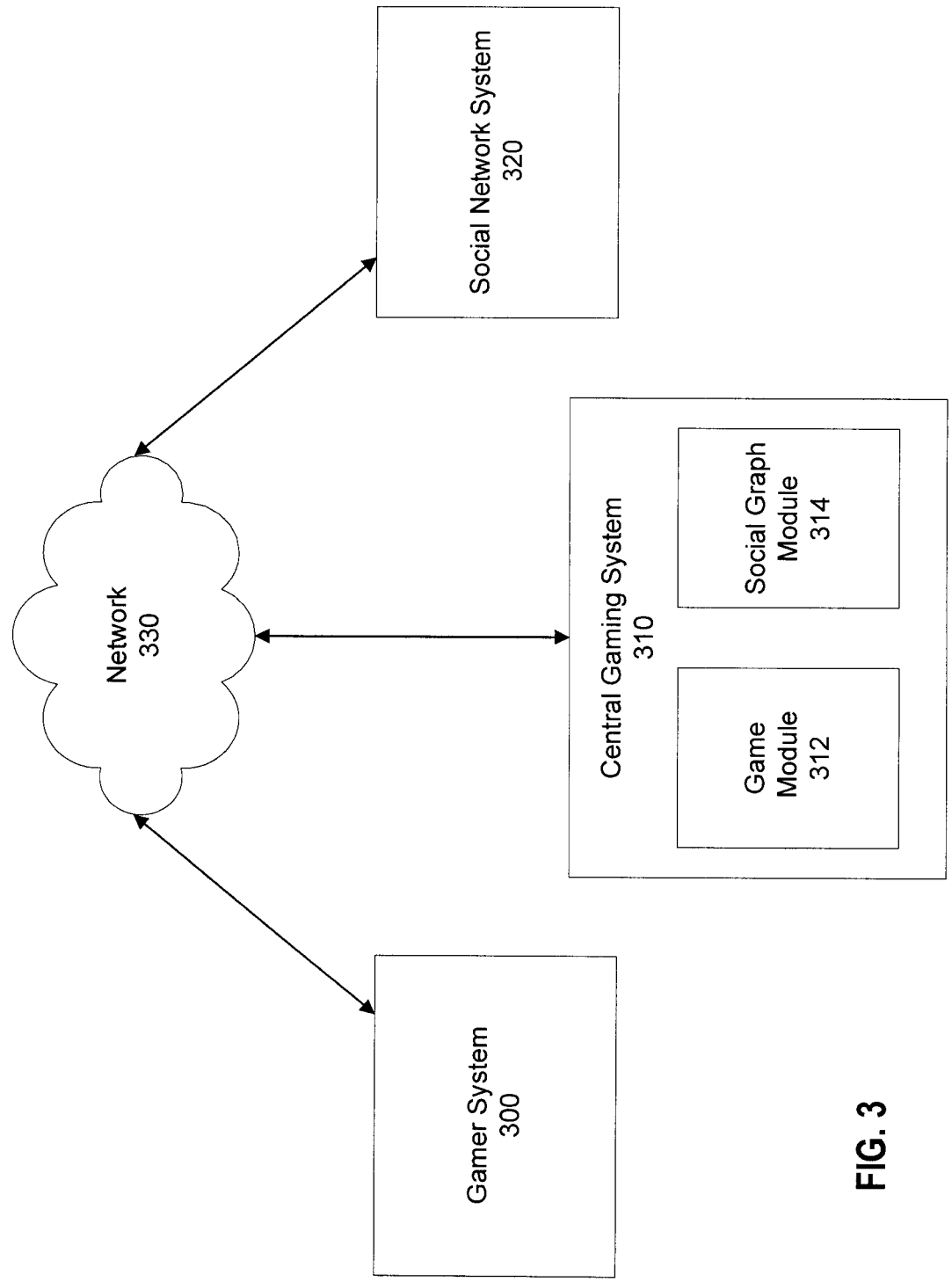
FIG. 3 is a block diagram of hardware components of social game interactions according to a particular embodiment.

FIG. 3 illustrates a block diagram of hardware components of social game interactions according to a particular embodiment. The system for social game interactions may include a gamer system 300, a central gaming system 310, and a social network system 320, connected over a network 330. While each system and the network depicted in FIG. 3 are singular, each system and network may represent a plurality of systems and/or networks.

The gamer system 300, central gaming system 310, and social network system 320 may each include a network-enabled computer system and/or devices. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, a game server, a gaming console, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to social game interactions, as described herein.

A gamer system 300, central gaming system 310, and social network system 320 may each also contain data storage for storing and tracking gameplay data, published gameplay data, and interactions with published gameplay data. Data storage (not shown) may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, data storage 504 may be a database, such as an Oracle database, a Microsoft SQL Server database, a DB2 database, a MySQL database, a Sybase database, an object oriented database, a hierarchical database, a NoSQL type database, or other database. Data storage may also utilize flat file structures for storage of data.

Network 330 may be one or more of a wireless network, a wired network or any combination of wireless network and wired network. For example, network 330 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 330 may include, without limitation, telephone lines, fiber optics, IEEE Ethernet 902.3, a wide area network ("WAN"), a local area network ("LAN"), or a global network such as the Internet. Also network 330 may support an Internet network, a wireless communication network, a cellular network, or the like, or any combination thereof. Network 330 may further include one network, or any number of the exemplary types of networks mentioned above, operating as a stand-alone network or in cooperation with each other. Network 330 may utilize one or more protocols of one or more network elements to which they are communicatively coupled. Network 330 may translate to or from other protocols to one or more protocols of network devices. Although network 330 is depicted as a single network, it should be appreciated that according to one or more embodiments, network 330 may comprise a plurality of interconnected networks, such as, for example, the Internet, a service provider's network, a cable television network, corporate networks, and home networks.

A central gaming system 310 may include various modules to perform the functions described herein. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices. A central gaming system 310 may include a game module 312, which may include various hardware and software components for participating in gameplay, monitoring gameplay, calculating gameplay scores, and/or all other gameplay-related activities. A central gaming system 310 may also include a social graph module 314, which may include various hardware and software components for connecting to a social network system 320, manipulating social network objects, and interacting with a social network system 320.

FIG. 1 is a flowchart illustrating social game interactions by a gamer system, central game system, and social network system according to a particular embodiment. In step 100, central game system 310 may publish data received from gamer system 300 to a social network system 320. This data to publish may be in the form of alpha-numeric or other characters, an image, an event for people to RSVP to, a video, and/or some other form of media. This data may be published on a social network system 320 in various forms. For example, the data may be published on a social network system 320 in the form a posting to a social network member's web page (e.g., a Facebook or Google+post), the creation of a social network web page (e.g., a Facebook event, a MySpace page), a posting to a social networking message service page (e.g., a post made on Twitter), a posting to a photo sharing social network system (e.g., a Pinterest posting), and/or a posting to a video sharing social network system (e.g., a YouTube posting).

When data is published on a social network system 320, the data may be visible to a particular social network (step 130). Visibility may depend on privacy settings associated with the posting. Once visible to a social network, social network users may interact with the posted data (step 140). At step 140, a social network user may interact with the published data. This interaction may take a variety of forms, such as, for example, positively reviewing the published data (e.g., Facebook likes, Google+ +1s etc.), commenting on the published data, and/or referring other users to see it (Twitter re-tweets, Facebook share, Pinterest pinning). At step 110, an interaction by a gamer or other user may be tracked and/or recorded. Interactions with posted game data may be considered primary interactions, where an interaction with an interaction of game data may be considered a secondary interaction (e.g., liking a comment on Facebook, commenting on a re-tweet on Twitter, or another other interaction with a primary interaction). In step 110, a social graph module 314 of a central game system 310 connected to a social network system 320 may track a number of interactions (both primary interactions and secondary interactions) and the user associated with the interaction. Also, the social network system 320 may track a number of interactions and the user associated with user interaction and then send the interaction data to the central game system 310. Interactions data may include, for example, time and date of interaction, type of interaction (e.g., positive interaction, commentary interaction, sharing interaction), user who performed the interaction, and/or whether the interaction is a primary interaction or a secondary interaction. At step 120, a game module 312 of a central game system 310 may use the interaction data to calculate a gameplay score. At step 120, a separate gameplay score may be calculated for primary interactions and secondary interaction. Also, a single gameplay score may be calculated for all types of interactions. At step 150, a game module 312 in a central game system 310 may apply the calculated gameplay score(s) to an associated gameplay event in game module 312 and transfer to game results to the associated gamer system 300. Additionally, a reward may be sent to a gamer system based on the calculated gameplay score(s). A reward may be any type of reward including, but not limited to, gameplay credits, unlocking gameplay levels and/or options, sponsored advertiser-related rewards, and any other form of reward.

Figure 2:
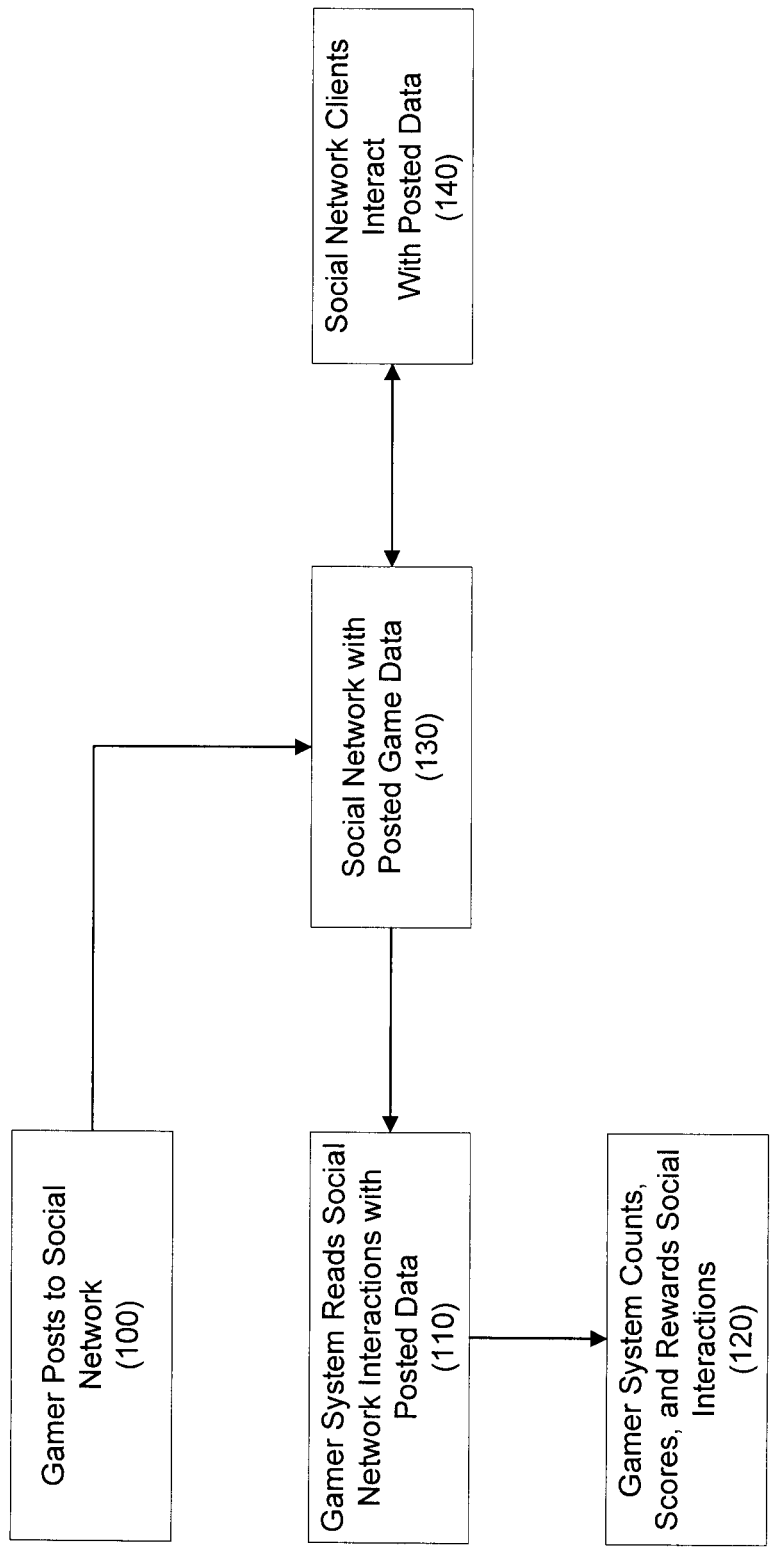
FIG. 2 is a flowchart illustrating social game interactions by a gamer system and a social network system when a central game system is not present according to a particular embodiment.

FIG. 2 shows an exemplary flow of interaction without a central game server acting as an intermediary. In this case, step 100 a gamer system may transmit game data to be published to a social network system 320. The game data may still be the same game data that is published to a social network system 320 for tracking as seem in step 130. Both steps 110 and 120 may be handled by a game module (not shown) housed in a gamer system 300.

It is to be appreciated that the set of instructions, e.g., the software that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A method comprising:
    transmitting, to a social network system from a gaming system via a network, gaming data to be published at the social networking system;
    receiving, at the gaming system from the social network system via a network, interaction data indicating a third party social network user has interacted with the published gaming data, wherein the interaction data includes at least a type of interaction;
    calculating, at the gaming system, an interaction score based on the received interaction data;
    applying, at the gaming system, the interaction score to a gameplay event associated with the published gaming data; and
    transmitting, to a gamer device from the gaming system via a network, a reward based on the interaction score.

2. The method of claim 1, wherein the interaction data further includes: time and date of interaction, user who performed the interaction, and whether the interaction is a primary interaction or a secondary interaction, wherein the secondary interaction interacts with the primary interaction.

3. The method of claim 2, wherein a primary interaction is of more value than a secondary interaction when calculating the interaction score.

4. The method of claim 1, wherein a type of interaction is selected from the group comprising: a positive interaction, a commentary interaction, and a sharing interaction.

5. The method of claim 1, wherein a reward may be selected from the group comprising: gameplay credits, unlocking gameplay levels and/or options, and sponsored advertiser-related rewards.

6. The method of claim 1, wherein gaming data includes a start time and date of gameplay.

7. The method of claim 6, wherein gaming data further includes a completion time and date of gameplay.

8. The method of claim 7, wherein each at least one interaction must be received before the completion time and date of gameplay in order to be used in calculating the interaction score.

9. The method of claim 1, wherein the interaction data further includes at least one of: a size of an interactor's social network and a number of social network relationships the interactor has with players of the gameplay event, and wherein the interaction score is weighted based on the interaction data.

10. A non-transitory computer readable medium configured to perform the steps of claim 1.

11. A system comprising:
    at least one gaming processor configured to:
        transmit, to a social network system via a network, gaming data to be published at the social networking system;
        receive, from the social network system via a network, interaction data indicating a third party social network user has interacted with the published gaming data, wherein the interaction data includes at least a type of interaction;
        calculate an interaction score based on the received interaction data;
        apply the interaction score to a gameplay event associated with the published gaming data; and
        transmit, to a gamer device via a network, a reward based on the interaction score; and
    at least one data storage configured to store the gaming data, interaction data, and interaction data.

12. The system of claim 11, wherein the interaction data further includes: time and date of interaction, user who performed the interaction, and whether the interaction is a primary interaction or a secondary interaction, wherein the secondary interaction interacts with the primary interaction.

13. The system of claim 11, wherein a type of interaction is selected from the group comprising: a positive interaction, a commentary interaction, and a sharing interaction.

14. The system of claim 11, wherein a reward may be selected from the group comprising: gameplay credits, unlocking gameplay levels and/or options, and sponsored advertiser-related rewards.

15. The system of claim 11, wherein a primary interaction is of more value than a secondary interaction when calculating the interaction score.

16. The system of claim 15, wherein gaming data further includes a completion time and date of gameplay.

17. The system of claim 11, wherein gaming data includes a start time and date of gameplay.

18. The system of claim 17, wherein each at least one interaction must be received before the completion time and date of gameplay in order to be used in calculating the interaction score.

19. The system of claim 11, wherein the gaming processor and the gamer device are contained within the same device.

* * * * *